United States Patent [19]
Hammerslag

[11] Patent Number: 5,927,938
[45] Date of Patent: Jul. 27, 1999

[54] BATTERY CHARGING AND TRANSFER SYSTEM FOR ELECTRICALLY POWERED VEHICLES

[75] Inventor: Julius G. Hammerslag, San Juan Capistrano, Calif.

[73] Assignee: Unlimited Range Electric Car Systems Company, San Clemente, Calif.

[21] Appl. No.: 08/851,621

[22] Filed: May 6, 1997

Related U.S. Application Data

[63] Continuation-in-part of application No. 08/745,423, Nov. 12, 1996, Pat. No. 5,711,648, which is a continuation-in-part of application No. 08/614,130, Mar. 12, 1996, abandoned, which is a division of application No. 08/178,101, Jan. 6, 1994, Pat. No. 5,549,443.

[51] Int. Cl.⁶ .................................................. B65G 67/00
[52] U.S. Cl. ................ 414/809; 320/109; 320/FOR 101; 320/34; 180/68.5; 414/390; 414/398; 414/401; 414/396; 194/904
[58] Field of Search ...................... 414/396, 398, 414/400, 401, 584, 390, 800, 806, 809; 104/34; 180/68.5; 320/9, DIG. 34, FOR 101; 194/904, 205

[56] References Cited

U.S. PATENT DOCUMENTS

| | | |
|---|---|---|
| 1,764,354 | 6/1930 | Schellentrager et al. . |
| 1,858,768 | 7/1932 | Ellstrom . |
| 3,708,028 | 1/1973 | Hafer . |
| 3,838,745 | 10/1974 | Kappei . |
| 4,299,526 | 11/1981 | Smith . |
| 4,334,819 | 6/1982 | Hammerslag . |
| 4,342,533 | 8/1982 | Hane . |
| 4,450,400 | 5/1984 | Gwyen . |
| 4,983,903 | 1/1991 | Bae et al. . |
| 5,263,565 | 11/1993 | Wilkinson ............................. 320/109 X |
| 5,327,066 | 7/1994 | Smith ....................................... 320/109 |

FOREIGN PATENT DOCUMENTS

| | | |
|---|---|---|
| 444975 | 9/1991 | European Pat. Off. .............. 180/68.5 |
| 2114962 | 8/1972 | Germany . |
| 2236215 | 5/1973 | Germany . |
| 2259505 | 6/1974 | Germany . |
| 2410102 | 9/1975 | Germany . |
| 2422960 | 11/1975 | Germany . |
| 4229687 | 3/1994 | Germany .................................. 320/2 |
| 294147 | 11/1996 | Japan . |
| 1438603 | 6/1976 | United Kingdom . |
| 1575005 | 9/1980 | United Kingdom . |
| 2277067 | 9/1994 | United Kingdom . |

*Primary Examiner*—Frank E. Werner
*Attorney, Agent, or Firm*—Knobbe, Martens, Olson & Bear, LLP

[57] ABSTRACT

A battery transfer and charging system for electrically powered vehicles includes a conveyor loop for conveying batteries from a battery receiving station to a battery delivery station. A displacement assembly removes spent batteries of electric vehicles by placing charged batteries into position within the vehicles so as to laterally displace spent batteries. Spent batteries displaced from vehicles are received by the receiving station, where the batteries are tested both electrically and by comparing battery status data against predetermined criteria. Batteries which fail the battery test are automatically removed from the conveyor loop by a elevator assembly. Batteries are automatically charged as they pass through the conveyor loop in an assembly-line fashion. Following recharge, batteries are conveyed to the displacement station for installation within later vehicles. In one embodiment of the system, vehicles are processed through the system in sequential order, stopping at a specified location for battery installation/removal.

21 Claims, 15 Drawing Sheets

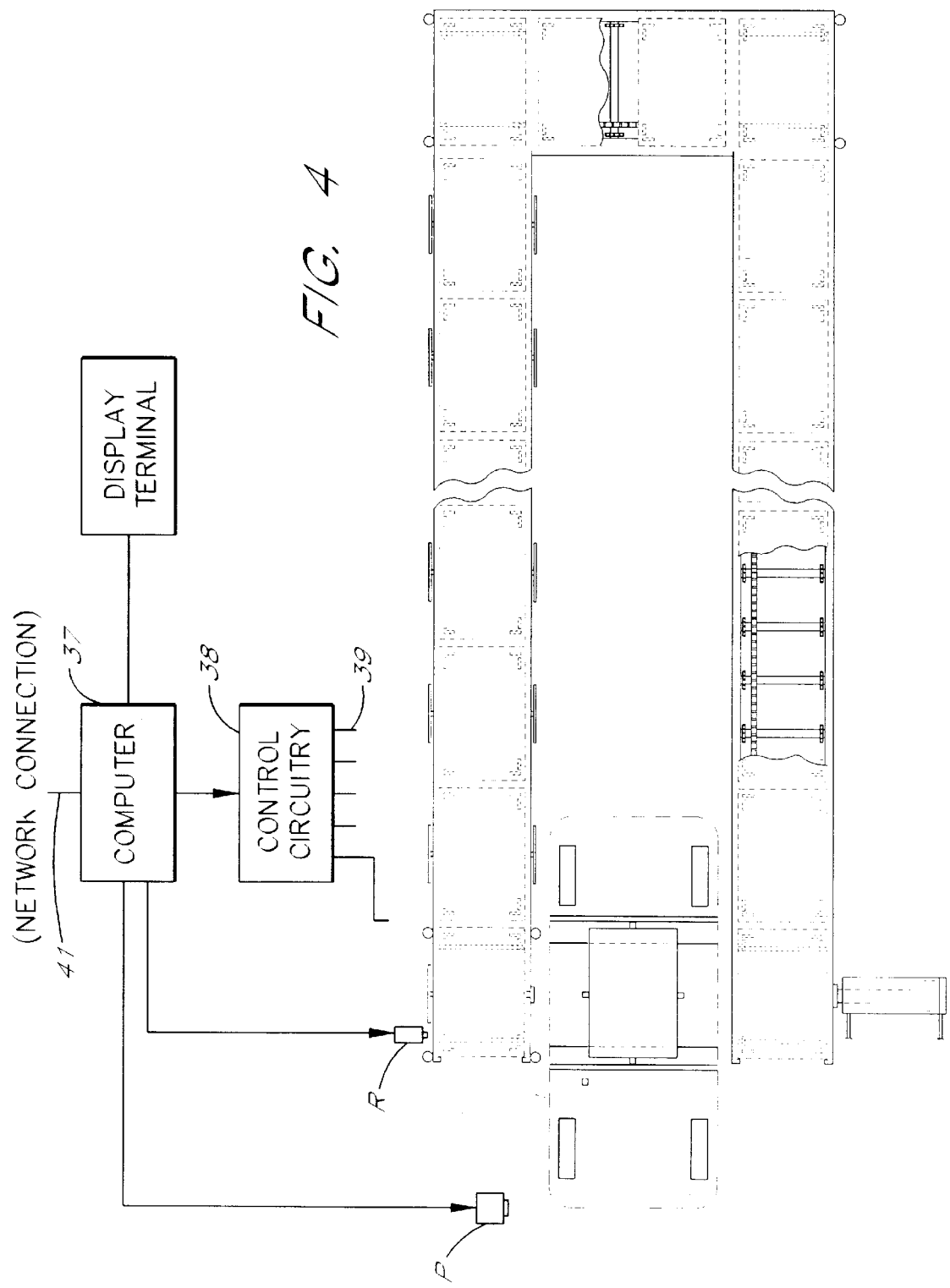

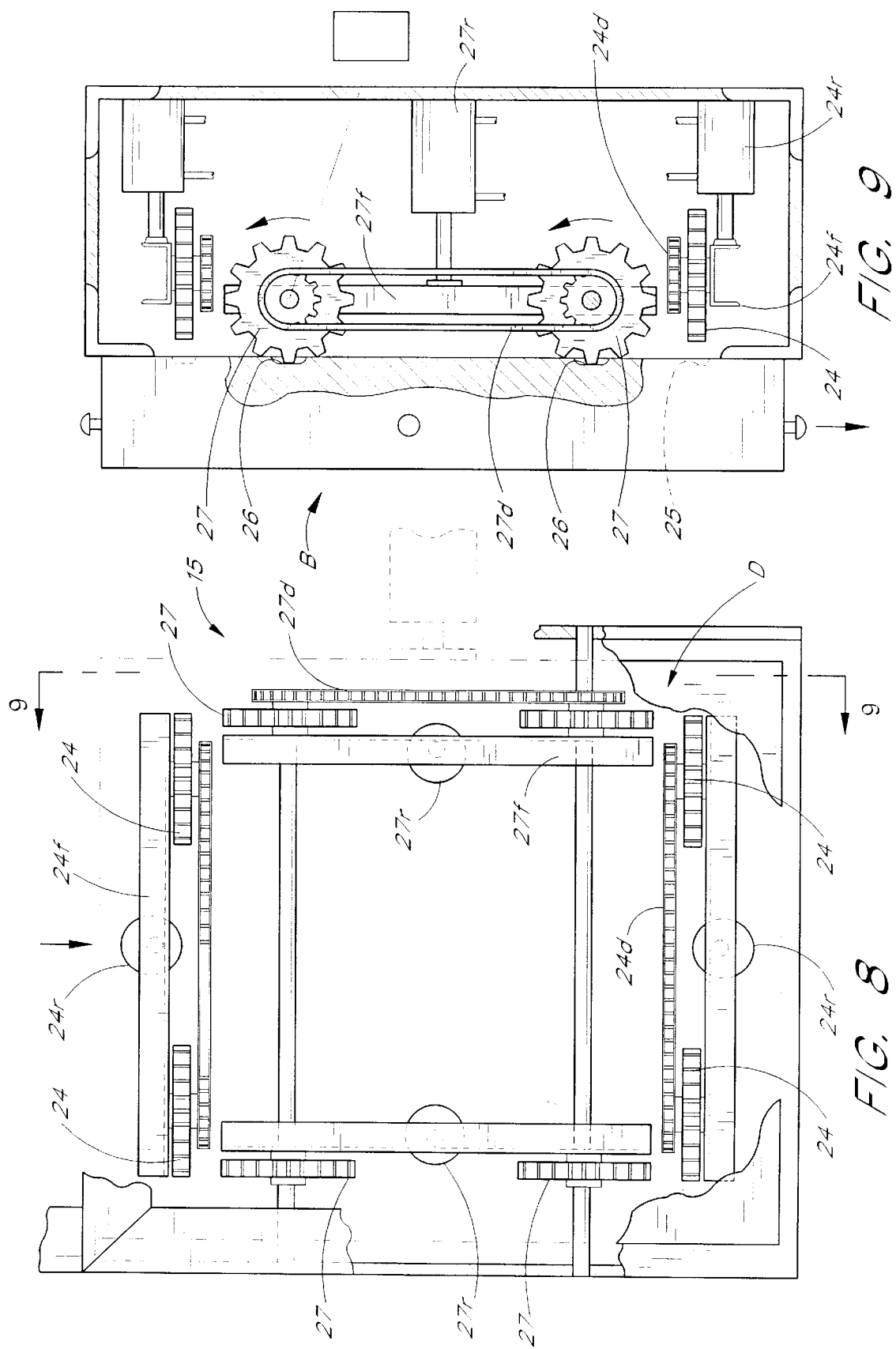

BATTERY CHARGING AND TRANSFER SYSTEM FOR ELECTRICALLY POWERED VEHICLES

RELATED APPLICATIONS

This application is a continuation-in-part of U.S. Appl. Ser. No. 08/745,423, filed Nov. 12, 1996 (titled "Battery Charging and Transfer System"), now U.S. Pat. No. 5,711,648 which is a continuation-in-part of U.S. Appl. Ser. No. 08/614,130, filed Mar. 12, 1996 (of the same title), now abandoned, which is a division of U.S. Appl. Ser. No. 08/178,101, filed Jan. 6, 1994 (now U.S. Pat. No. 5,549,443).

BACKGROUND OF THE INVENTION

The present invention relates to battery charging and transfer systems. More particularly, the present invention relates to battery charging and transfer systems which enable the automated exchange and charging of electric vehicle batteries, including batteries for automobiles, motorscooters and other electrically powered motor vehicles.

U.S. Pat. Ser. No. 4,334,819 discloses a continuous battery charging system wherein batteries are removed from an electrical vehicle at a battery transfer station. A fresh battery is installed at the transfer station, and the spent battery is placed in a charging system to be charged and returned to the transfer station.

That system contemplates the existence of a need for capability to charge a large number of exchangeable batteries, say, following adoption and acceptance by the motoring public of the concept of electric powered vehicles. One disadvantage of electric powered vehicles is the relatively short range that can be achieved using known battery technology. In order to provide a practical electric vehicle system, battery transfer capabilities must exist at numerous locations, so that the range of travel, without requiring the driver to recharge a battery, may be substantial. This is to say that if the range of an electric vehicle, without recharge of the battery or battery pack is 100 miles, then the user is limited to excursions of 50 miles. However, if at 75 or 100 mile intervals, the user can conveniently replace the partially spent battery with a fresh or fully charged battery, the limit of safe travel is extended.

Thus, the prior patent discloses an invention which enables longer range use of electric vehicles, because charged or fresh batteries can be expeditiously installed in the vehicle at locations along a course of a length greater than the round trip capability of the vehicle battery. Notwithstanding the foregoing, there remains a need for an electric battery charging and transfer system which enables the convenient removal of discharged batteries from a vehicle and replacement with a fully charged battery. The batteries and the charging system must be adapted to efficiently handle the battery during the removal, charging, and installation procedures.

SUMMARY OF THE INVENTION

To render a battery transfer and charging system of the type generically contemplated in the above-identified patent more universally applicable and commercially acceptable, the present invention provides improvements in the system in terms of the transfer method, for exchanging batteries at the transfer station, and in the mode of construction of the charging stations. In accordance with the present invention, an efficient electric battery charging and transfer station is provided that is fully automated and adaptable to a variety of battery powered, electric motor vehicles. By utilizing a continuously charging conveyor belt, one of the biggest drawbacks of electric vehicles is eliminated: the lengthy and impractical immobilization of the vehicle while the battery is being recharged. The continuous operation of the battery charging and transfer station provides for exchanging a discharged battery with a charged battery in seconds, rather than hours.

More particularly, the present invention contemplates that the electric vehicle is provided with a battery or battery pack in a relatively long and broad, but flat form, which can be laterally installed in the vehicle. The battery may be a unit of, for example, 5' wide, 5' long and 9" in height, or a composite of a series of connected smaller batteries in a pack or box confining the smaller batteries. In another embodiment, the battery may be a unit of, for example, 2' wide, 2' long and 1.5" in height for use in smaller electrically powered vehicles such as an electric motorscooter. In any case, the battery (unit or pack) readily can be displaced laterally from the vehicle, as by laterally forcing a fresh battery into a battery seat in the vehicle or by laterally exchanging the battery using a sprocket, belt or other mechanism. In the battery seat, contact of the battery terminals with the drive motor for the vehicle is automatically established.

With such a system, vehicles can be sold with an initial battery which can be exchanged for a fresh battery at a transfer station for a relatively small cost, amounting to the re-charging cost of the battery, plus depreciation and exchange, by a battery charging organization having stations located strategically in areas to service a growing population of compatible electric vehicles.

To facilitate growth of a system of battery transfer stations, the stations according to the present invention are preferably modular in construction. This enables a transfer station to be erected with low initial investment cost, and subsequently enlarged as demand increases. In addition, capacity upgrades through modular expansion allow the battery charging and transfer station to achieve maximum productivity. Modular expansion also provides increased capacity without the need for, or added expense of additional space. Thus, the present invention provides a tremendous competitive advantage in locations where space to construct additional transfer stations is sparse.

In accomplishing the foregoing, a battery transfer station is provided into which a standardized vehicle can be driven. The standardized vehicle may be an automobile, a motorscooter, or any other battery powered, electric motor vehicle. The vehicle has a battery seat means for containing a relatively broad, flat battery. A charged battery can be shifted laterally into position within the battery seat means. In one embodiment, as the charged battery is shifted into position, the charged battery comes into contact with the existing battery and laterally forces the existing battery out of the battery seat means to a receiving means. Sprockets of the receiving means engage with notches on the bottom surface of the existing battery as the existing battery is displaced from the battery seat means. The sprockets complete the removal of the existing battery from the vehicle. In other embodiments, removal of the battery is accomplished in-whole or-in-part using drive sprockets in the floor of the battery compartment which engage with the notches on the battery. These sprockets may be powered using an external energy source which is coupled to the vehicle (via a slidably-engaging electrical connector) when the vehicle initially enters the charging station. Alternatively, the battery itself may be partially exposed on its underside, and the sprockets may engage with the notches in the battery by rising up from the base of the transfer station.

Drive means are provided to shift a fresh battery horizontally into the battery seat, and means are provided to receive the spent battery in the charging system. The spent battery is tested, rejected if unfit for recharge, or recharged in sequence with other batteries, while being transported through charging locations to the transfer station, for installation in a later vehicle.

One aspect of the invention is a battery transfer station equipped for handling a standardized two-wheel vehicle, such as a motorscooter. The vehicle contemplated has a battery seat means for containing a relatively broad, flat battery, which is preferably located near the area where an operator's feet are positioned on the motorscooter. The motorscooter charging and transfer system is designed with a wheel receptacle area that allows for proper positioning and control of the vehicle during battery transfer. A vehicle securing station maintains the vehicle in an upright position at all times during the battery transfer operation.

In one embodiment, the motorscooter system is designed such that the vehicle operator must dismount the vehicle during the battery transfer operation, and the system is specially equipped for efficient handling and safety of the dismounted vehicle operator. An elevated support area provides for operator safety during battery transfer by elevating the operator above the actual battery transfer location. In one embodiment, the transfer system for the motorscooter also incorporates a sensor to detect whether the vehicle operator is safely positioned above and away from the battery transfer conveyor.

The charging and transfer systems may be built in a vertical orientation in which the transfer conveyor extends above the vehicle rather than laterally around the vehicle. A vertically oriented system provides all of the features and benefits described above but in a much smaller physical area. Thus, the transfer conveyor can extend vertically preserving essential land in space-limited geographic regions.

This invention has other advantages and features which will best be understood by reference to the preferred embodiments disclosed herein, but it is to be understood that the following detailed description and the accompanying drawings are not to be taken in a limiting sense. The invention is defined in the appended claims.

BRIEF DESCRIPTION OF THE DRAWINGS

FIG. 4 illustrates the primary computer-based components of the system;

FIG. 7 is a transverse, fragmentary sectional view on the line 7—7 of FIG. 2;

FIG. 8 is an enlarged, fragmentary top plan view, on the line 8—8 of FIG. 3, with parts broken away, showing the battery installation means;

FIG. 9 is a vertical sectional view on the line 9—9 of FIG. 8, with parts broken away;

DETAILED DESCRIPTION OF THE PREFERRED EMBODIMENTS

Figure 1:
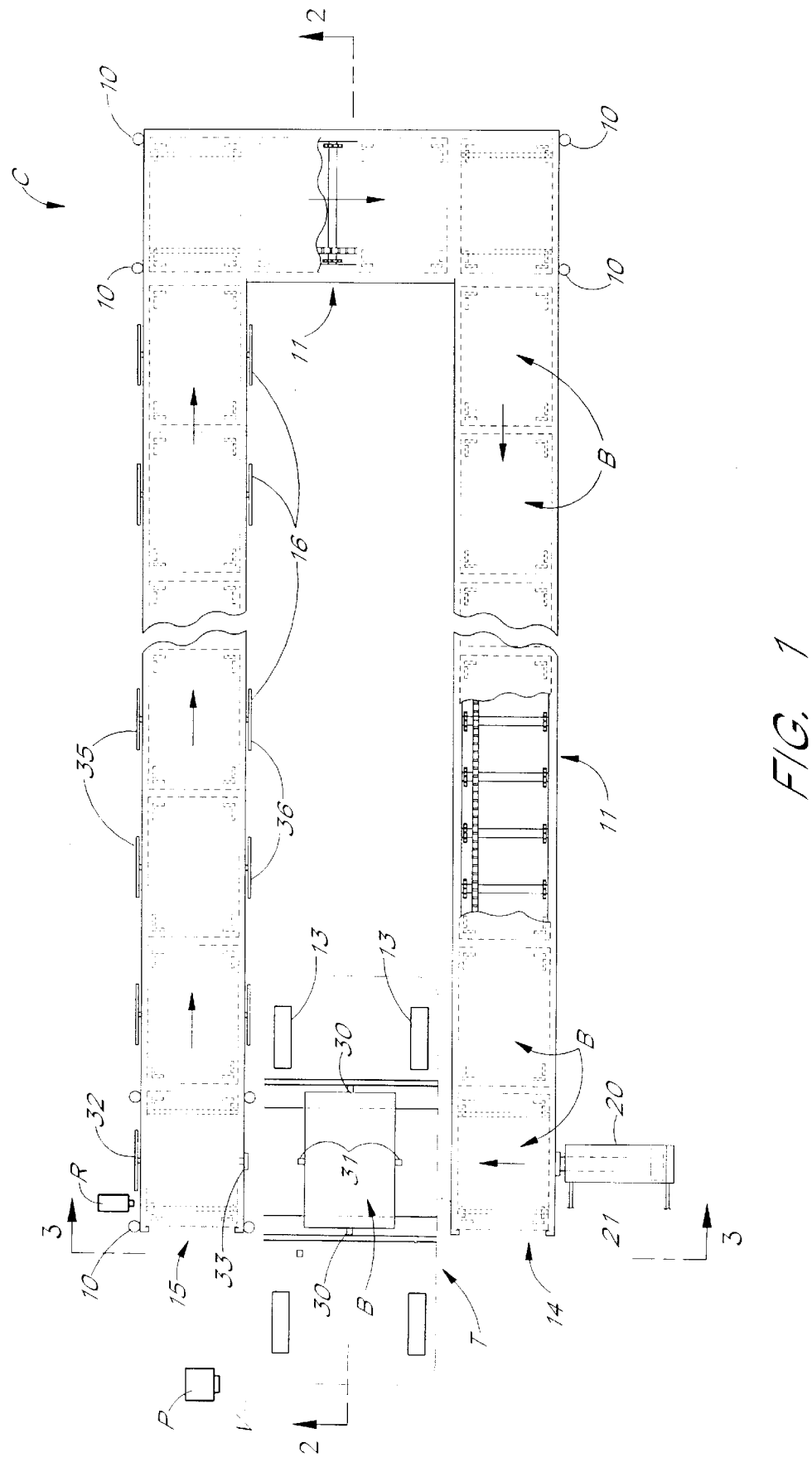
FIG. 1 is a top plan view, with parts broken away, showing a battery transfer and charging system in accordance with the present invention.
Figure 2:
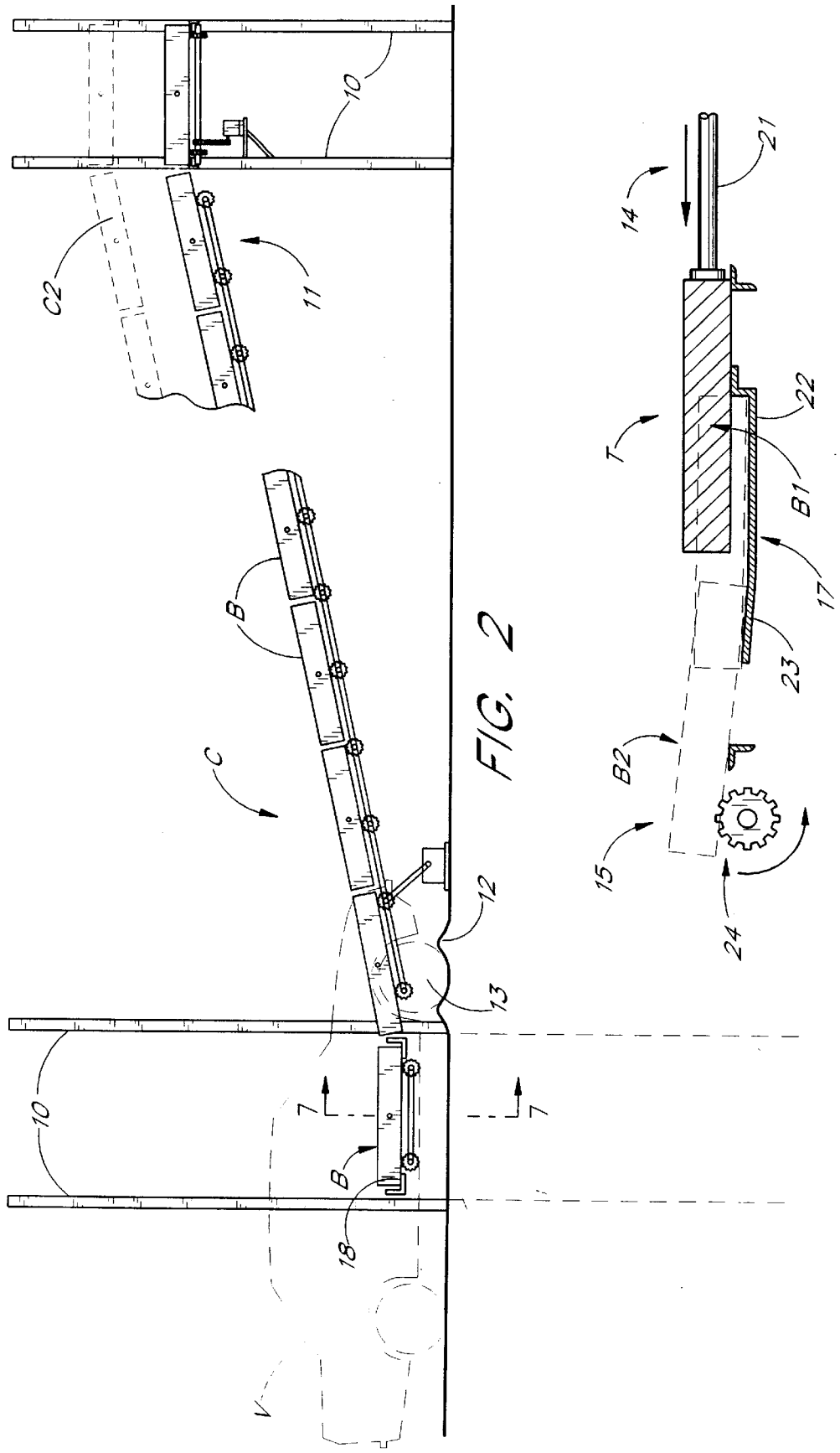
FIG. 2 is a vertical sectional view on the line 2—2 of FIG. 1, showing a first module in full lines, and showing additional modules in broken lines.
Figure 3:
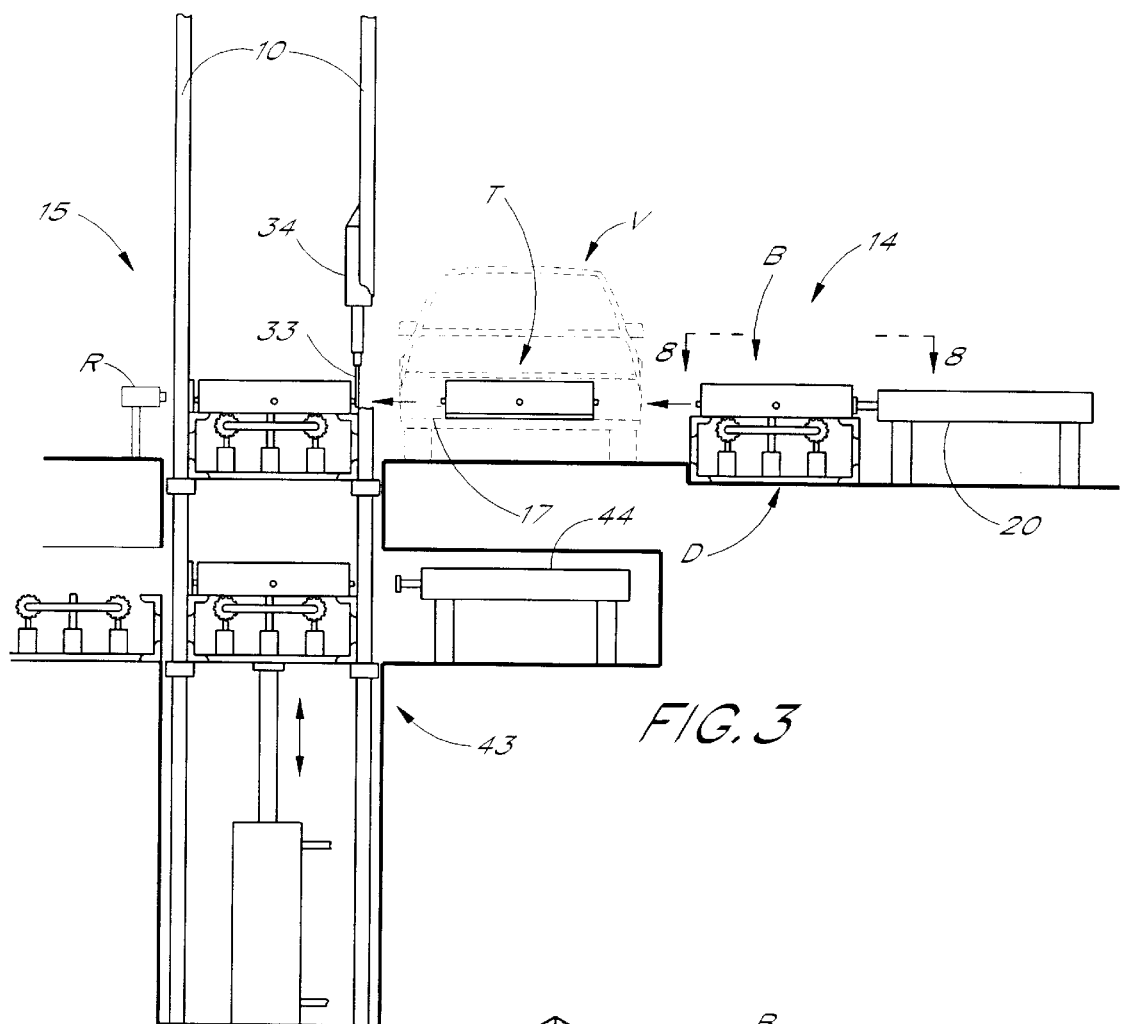
FIG. 3 is a transverse sectional view on the line 3—3 of FIG. 1.

FIGS. 1–3 illustrate the general layout and structure of a battery charging and transfer system in accordance with a preferred embodiment of the invention. As best illustrated by FIG. 1, the system comprises a continuous battery conveyor loop C which extends from one side of a vehicle station (shown with a vehicle V positioned therein) to the opposite side of the vehicle station. Batteries B move through the conveyor loop from a receiving end or station 15 of the conveyor to a delivery end 14 of the conveyor while being charged via multiple battery chargers 16. The system also includes a transfer station or apparatus T which laterally shifts a fresh (charged) battery into a battery compartment 17 (FIG. 3) of the vehicle V from the delivery end 14 (as described below) while displacing an existing (discharged or partially discharged) battery from the vehicle and onto the receiving end 15 of the conveyor.

As illustrated in FIG. 1, the battery chargers 16 are positioned along the conveyor C at respective battery resting locations ("battery locations") to recharge the batteries as they are conveyed from the receiving end 15 to the delivery end 14 of the conveyor. In the preferred embodiment, a battery charging station 16 is provided at each battery location along the two longitudinal runs or segments of the conveyor C. As described below, the battery position at the receiving end 15 of the conveyor serves as a battery testing and removal station for (i) determining whether each extracted battery can be effectively recharged, and (ii) removing bad batteries from the system.

As illustrated in FIG. 2, the conveyor structure preferably includes a number of vertical support posts 10, on which a frame structure 11 is mounted in a suitable fashion. The posts 10 extend vertically to enable the application thereto of one or more of vertically-spaced expansion modules C2, as further illustrated in FIG. 10 (discussed below). Each expansion module comprises a conveyor loop which is substantially identical in structure and operation to the conveyor loop C described herein.

As further illustrated in FIG. 2, the transfer station T includes a positioning structure 12, shown as a receptacle for the front wheels 13 of the vehicle V, as the vehicle is driven into the transfer station T, whereby vehicles of standard length are uniformly longitudinally positioned in the transfer station. If desired, plural positioning means 12 may be provided at the spaced locations for vehicles of different lengths. As illustrated in FIG. 3, the battery compartment 17 of the vehicle extends through the vehicle below the passenger compartment from one side of the vehicle to the other. As illustrated in FIGS. 1 and 3, a hydraulic ram 20 or other shifting means is utilized, in combination with drive sprockets which engage with notches on the batteries (as described below), to shift a charged battery from the conveyor and into the vehicle V. As further described below, the incoming battery displaces the existing vehicle battery from the compartment 17 to a sufficient degree to permit a set of drive sprockets at the receiving end 15 of the conveyor to complete the removal of the existing battery. Alternatively, lateral battery displacement may be performed entirely through the use of drive sprockets without the use of a hydraulic ram. As illustrated by FIG. 1, the conveyor structure extends longitudinally from the receiving end 15, thence transversely and in a return run to the delivery end 14. Thus, lateral space to accommodate the vehicle between longitudinal runs is provided. As illustrated in FIG. 2, the transverse section of the conveyor loop (i.e., the segment which connects the two, parallel longitudinal segments) is elevated, with the longitudinal segments upwardly inclined from the transfer station T to the transverse segment. This allows vehicles to drive beneath the elevated, transverse section (between the vertical support posts 10) following battery exchange. Alternatively, the transverse section readily can be positioned beneath the path of the exiting car, if desired. This conveyor arrangement allows vehicles to enter and exit the system without reversing direction, and thus allows vehicles to efficiently pass through the system in a sequential fashion.

Figure 10:
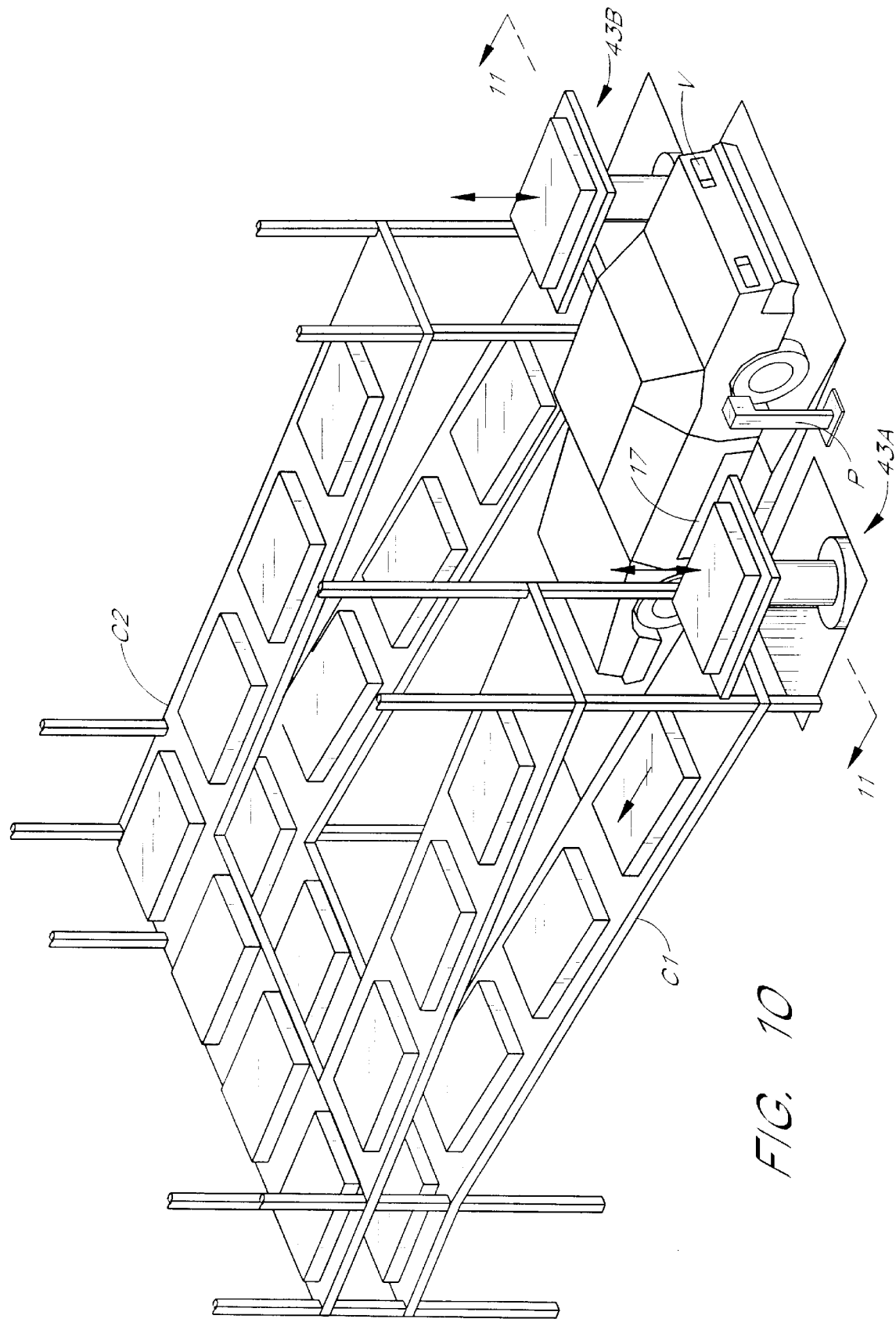
FIG. 10 is a perspective view illustrating the general manner by which expansion conveyors are added to the system.
Figure 11:
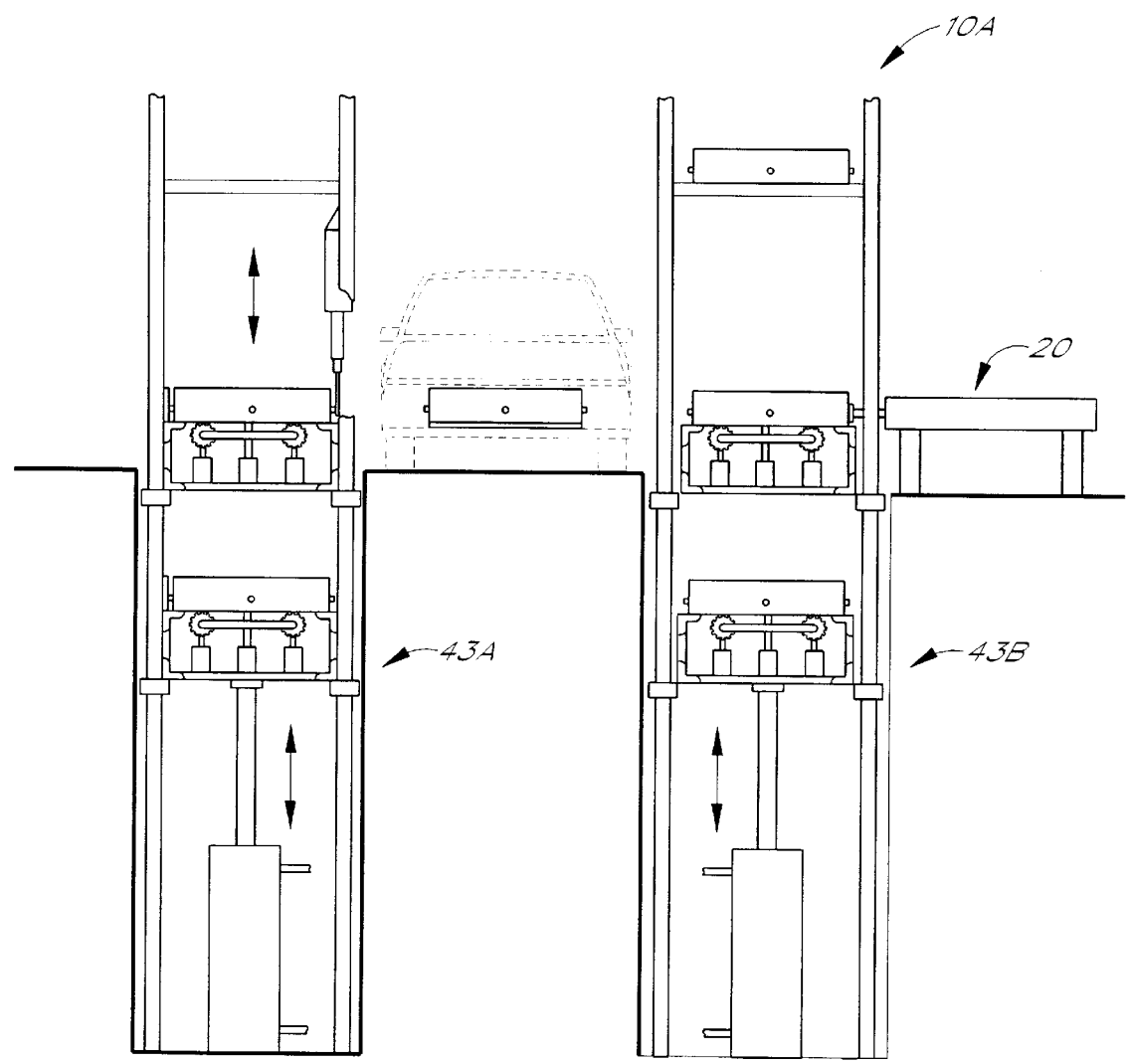
FIG. 11 is a transverse sectional view taken along the line 11—11 in FIG. 10.

With reference to FIG. 3, the system includes a battery elevator assembly 43 which allows the extracted battery to be shifted vertically relative to the conveyor C following removal from the vehicle. The elevator assembly 43 operates in cooperation with a battery removal assembly 44 to remove batteries from the conveyor system, such as when the extracted battery fails a battery test. The elevator assembly 43 is also coupled to a battery insertion assembly (not shown) for inserting new batteries into the conveyor system to replace discarded batteries. In implementations which include one or more expansion modules C2 (as in FIGS. 10 and 11), the elevator assembly 43 is also used move batteries between the multiple conveyor levels, as further described below. A second battery elevator may be provided at the battery delivery end 14 of the conveyor, as illustrated in FIGS. 10 and 11.

As depicted in FIG. 4, the system includes a computer 37 which controls the operation of the conveyor via conventional control circuitry 38. The control circuitry 38 may be in the form of one or more standard add-on cards which plug into expansion slots of the computer. The control circuitry 38 is coupled to the various electrically-actuated components of the conveyor and elevator assemblies via respective control lines 39, which carry control signals generated by the control circuitry in response to commands from the computer 37.

The computer 37 is preferably coupled to an electronic payment system P (FIGS. 4 and 10) which allows an operator of the vehicle V to enter payment information for paying a fee associated with the exchange of a battery. In the preferred embodiment, the payment system P comprises a magnetic card reader in combination with a standard keypad (not shown). In other embodiments, the payment system P may include, for example, and RF (radio frequency) transceiver which communicates bi-directionally with vehicle transponders of the type commonly used for making toll road payments.

The computer 37 is also preferably coupled to at least one bar code reader R, which is positioned along the conveyor to read bar code labels (FIG. 6) on the batteries. The bar code labels include battery ID codes which uniquely identify the batteries of the system. In a preferred embodiment, the computer uses these ID codes to access a centralized database and server 40 (FIG. 5A) via a network connection 41, such as a continuous connection to the Internet. As will be appreciated by those skilled in the art, other types of electronic sensing systems can be used in place of the disclosed bar code system. For example, the batteries could be provided with small, embedded RF transmitters, such as MicroStamp™ transmitters available from Micron Communications Inc., which transmit ID codes to a base RF receiver of the station.

Figure 5A:
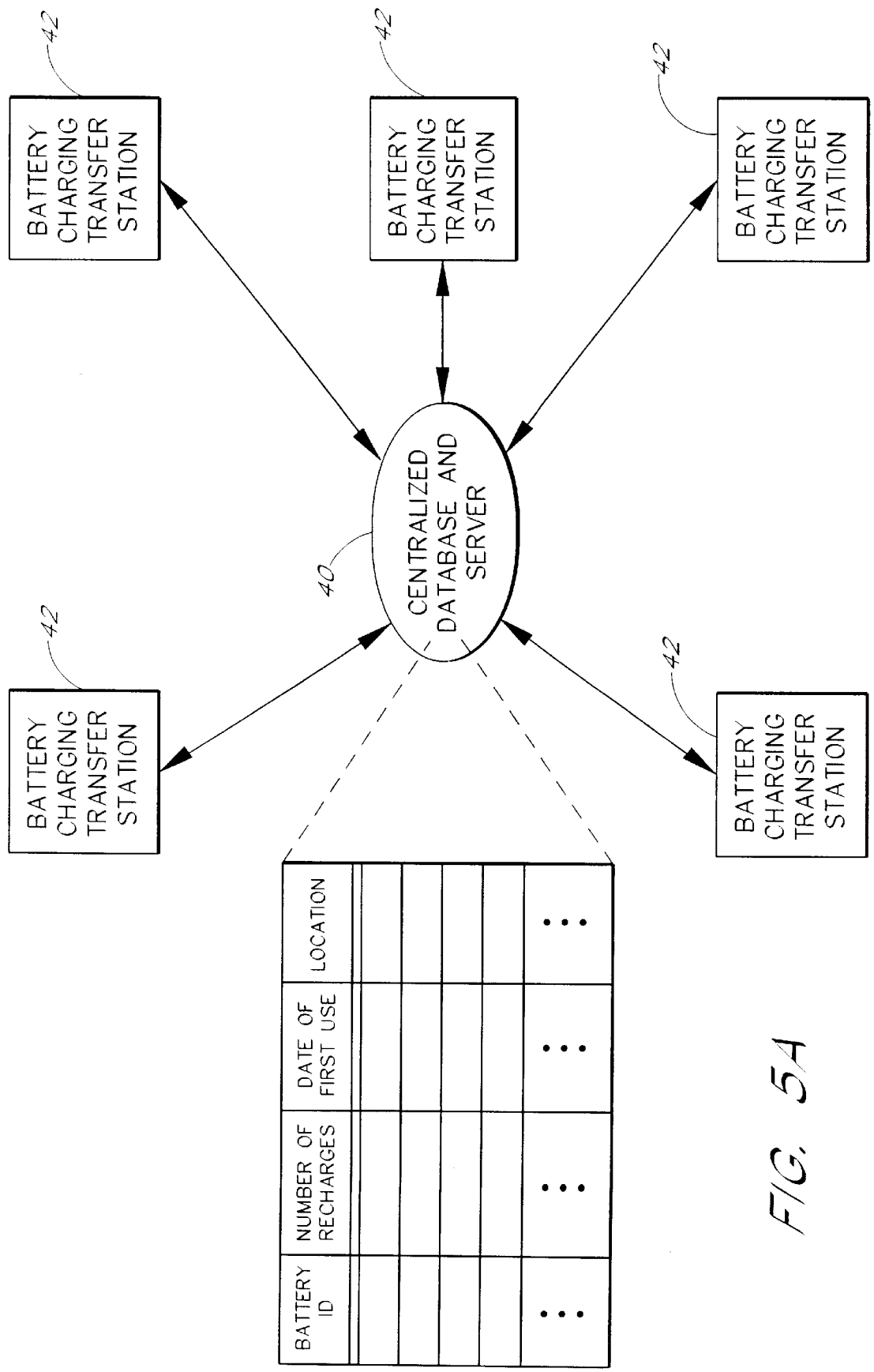
FIG. 5A is a block diagram showing a preferred database implementation in which battery history data is maintained in a centralized computer database.

With reference to FIG. 5A, the centralized database 40 is accessed by the respective computers of multiple, geographically-distributed battery charging and transfer stations 42 (preferably of the same construction as described herein). As further illustrated, the database includes battery tracking and history information ("history data") which is stored, on a battery-specific basis, in association with the unique ID codes of the batteries. For each battery, this information may include, for example, the number of times the battery has been recharged, the date of first use within a vehicle, and the current location (e.g., charging station or vehicle) of the battery. When a given battery is located within a vehicle, the location information may include information about vehicle (such as a vehicle ID number) and/or the vehicle's driver (such as the driver's credit card number). Updates to the database 40 are made remotely from the battery charging/transfer stations 42 by sending update requests across the network to the server associated with the database. These update requests are generated by the computers 37 of the individual stations in response to battery exchange operations.

As further described below, whenever a discharged battery is removed from a vehicle, the computer 37 of the respective station 42 reads the battery's ID code, and then accesses the centralized database to retrieve the battery's history data. The computer 37 then uses this information, in addition to the results of an electrical battery test, to determine whether or not the battery should be discarded or otherwise removed from the system. This allows the decision of whether or not to discard the battery to be based on multiple criteria.

While the preferred embodiment uses a centralized database 40 to store battery history data, it will be recognized that other storage methods are possible. For example, the batteries readily can be adapted to store and provide access to their own respective history data via conventional solid state storage devices located with the battery housing. This approach reduces or eliminates the need for a centralized database 40, but does not provide the battery tracking capabilities of the centralized database approach. It will also be recognized that conventional caching techniques can be used to locally store respective copies of the history database 40 at the transfer stations 42, so that accesses to the centralized database 40 need not be performed each time a battery is exchanged.

The actual battery exchange in the vehicle can be accomplished in any of a variety of alternative ways, depending upon the configuration of the battery and the vehicle's battery receiving structures. For example, instead of forcible displacement of the installed discharged battery with a new charged battery, the installed discharged battery can be previously removed such as by a sprocket as will be discussed infra. In addition, although the preferred embodiment utilizes a lateral, horizontal installation and removal of the battery, variations will become apparent to one of ordinary skill in the art in view of the disclosure herein and the desired battery compartment configuration for the vehicle.

For example, the battery readily can be adapted for vertical removal from the automobile followed by vertical installation of the new battery. This alternative embodiment utilizing a lateral, vertical installation and removal of the battery creates a more compact system in space-limited geographic regions. Similarly, the battery readily can be horizontally removed along an axial direction such as from the rear of the car or from the front of the car. The precise location and mode of removal of the battery is a design consideration that can be optimized through routine experimentation by one of ordinary skill in the art, in view of such considerations as battery size, weight distribution in the vehicle, and other access considerations such as the location of doors, wheels and the like.

Although a single battery is preferred, two, three, four or more discrete batteries can also be removed or installed into a single vehicle. The use of multiple batteries contained in separate units may be desirable from an engineering or esthetic design standpoint, depending upon the automobile configuration and the total volume of battery desired. In addition, a principal running battery and a separate "reserve" battery may be desirable from a consumer convenience standpoint.

Adaptation of the various vertical lifts, conveyors and other structural components of the battery charging and transfer system of the present invention to accommodate each of these types of variations will be readily achievable by one of ordinary skill in the art in view of the disclosure herein.

A preferred apparatus and method for exchanging batteries will now be described. As illustrated by FIGS. 1 and 7, the transfer station T includes a hydraulic ram 20 having a rod 21 which extends outward to forcefully displace the battery or battery pack B into the vehicle. The rod 21 laterally forces the battery B1 (FIG. 7) into a battery seat 22 in the vehicle. The battery B1 displaces the existing vehicle battery B2, forcing the existing battery B2 onto an exit conveyor such as up an inclined ramp section 23 of the seat 22 toward the receiving end 15 of the conveyor.

The battery seat in the vehicle is structured to provide retention means to prevent lateral movement of the battery from the seat, except at the transfer station where suitable displacement means 16, such as the ram 20 is provided. Any of a variety of retention structures can be provided, depending upon the battery design and battery seat design. For example, one or more vertically extending ridges or projections can be provided at the installation side and/or the exit side of the battery to provide a stop over which the battery must travel to exit the car. The stop can be permanently positioned, or movable between a "locked" and "unlocked" position. Alternatively, any of a variety of battery compartment hatches can be used, which will normally be locked shut except during the battery exchange process. In the illustrated embodiment, the battery seat 22 (FIG. 7) is provided with a shoulder on the installation side of the seat, to prevent movement of the battery in the reverse direction.

Figure 6:
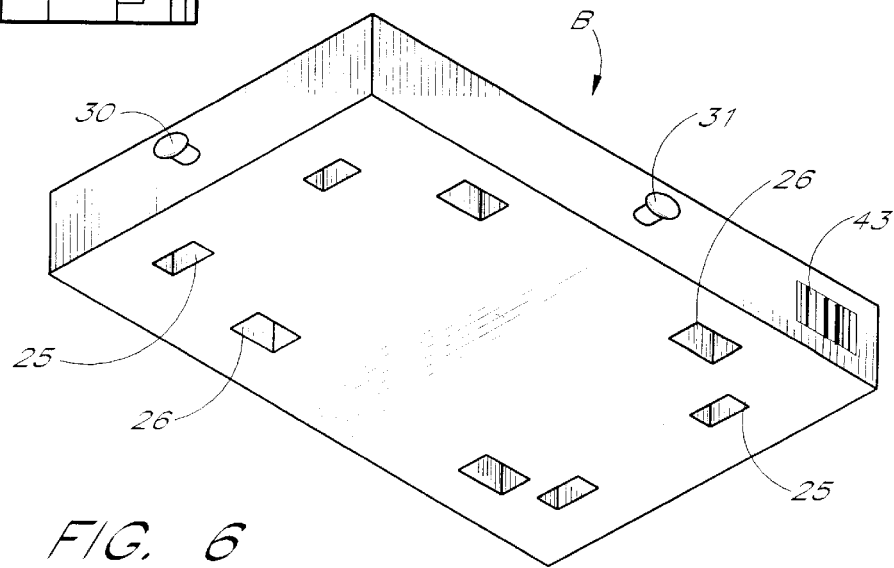
FIG. 6 is a predominantly bottom perspective view of an exemplary battery or battery box for use with the invention.

Drive means D, shown in FIG. 8, are provided to assist the lateral movement of the spent battery from the vehicle. Such drive means D may include, as partially shown in FIG. 7, driven sprocket means 24 adapted to engage in notches or recesses 25 (FIG. 6) on the bottom surface of the battery, to complete the transfer of the battery B2 from the vehicle onto the receiving station 15. The notches 25 are located preferably adjacent to the opposite ends of the battery B, and provide sprocket abutments enabling lateral drive of the battery. The underside of the battery also has laterally spaced sprocket receiving recesses 26, providing abutments engagable by additional drive sprockets 27 (FIGS. 8 and 9) adapted to engage and shift the batteries progressively through the charging stations in a lateral direction perpendicular to the direction of displacement. As is apparent from the figures, the notches 25, 26 illustrated in FIGS. 6 and 9 are representative of respective rows of notches which extend along the bottom surface of the battery.

Alternatively, any of a variety of engagement structures can be provided on the battery pack, to enable engagement with the drive mechanism of the transfer station. The use of a particular structure, such as hooks, rings, projections or recesses will depend upon the load of the battery to be transferred, the static friction or structural stop to be overcome in removing the battery, and the direction of removal, such as horizontal plane or vertical lift as will be readily apparent to one of skill in the art. In general, the engagement structures are preferably relatively low profile to minimize the opportunity for inadvertent interlocking with other batteries or parts of the system, and yet permit transfer of sufficient force to manipulate the battery through the transfer station. For this purpose, the present inventor prefers a plurality of spaced recesses on the battery housing, to be engaged by a sprocket as illustrated, or other engagement structure on the drive mechanism.

Although the system just described uses the incoming battery to forcibly displace the existing battery, other battery removal methods can be used. For example, the vehicles can be provided with drive sprockets within the battery compartment for moving batteries into and out of the battery compartment, eliminating the need to forcibly displace the existing battery. These sprockets may be powered using an external energy source which is coupled to vehicle (via a slidably-engaging electrical connector, for example) when the vehicle initially enters the charging station. In addition, although the present inventor prefers a system in which the batteries are introduced and removed in a continuous single direction path of travel, the conveyors and hydraulics of the transfer station can readily be modified by one of skill in the art to accomplish battery removal and installation from the same side of the vehicle if desired.

Alternatively, the underside of the battery may be exposed while situated in the vehicle, so that laterally spaced sprockets may engage from an area directly below the battery's underside, without the need for the vehicle to be equipped with drive sprockets. Optionally, this embodiment can be configured to upwardly lift the battery from the battery seat prior to shifting. Additional details of this embodiment in conjunction with the motorscooter system are discussed infra.

As illustrated by FIGS. 1 and 6, the battery has contact posts 30 at its opposite ends which are automatically engaged with contacts within the vehicle when the battery is shifted into the vehicle. Also, on opposite sides of the battery are charging contacts 31, which are also used as test contacts. Thus, when the battery is displaced from the vehicle at the transfer station T, the displaced battery enters the receiving station or position 15, and the contact 31 on one side engages a test rail 32 (FIG. 1). Preferably, the contact posts 30 and the charging contacts 31 are connected internally. Thus, battery charging is available at all battery positions of the conveyor, including battery positions on both the longitudinal and the transverse segments of the conveyor. As best illustrated by FIG. 3, a vertically shiftable test contact 33 is adapted to be elevated and lowered by a ram 34 at the receiving position 15, whereby the battery can be tested. With further reference to FIG. 3, the elevator assembly 43 is coupled to the receiving station 15 to enable bad batteries to be removed from the conveyor system under the control of the computer 37. The battery removal assembly preferably includes a hydraulic ram 44 which displaces the battery from the vertically-shiftable receiving station 15 once the battery has been lowered to the level of the ram 44.

As batteries are progressively moved along the conveyor C from one battery position to another, the posts or contacts 31 (FIG. 1) engage charging rails 35 and 36. The charging rails 35 and 36 are controlled by a voltage regulator (not shown) so that the charge level of the batteries is controlled. Although the charging rails 35, 36 are only shown along one of the two longitudinal segments of the conveyor in FIG. 1, charging stations are preferably provided along both longitudinal segments and transverse sections.

Figure 17:
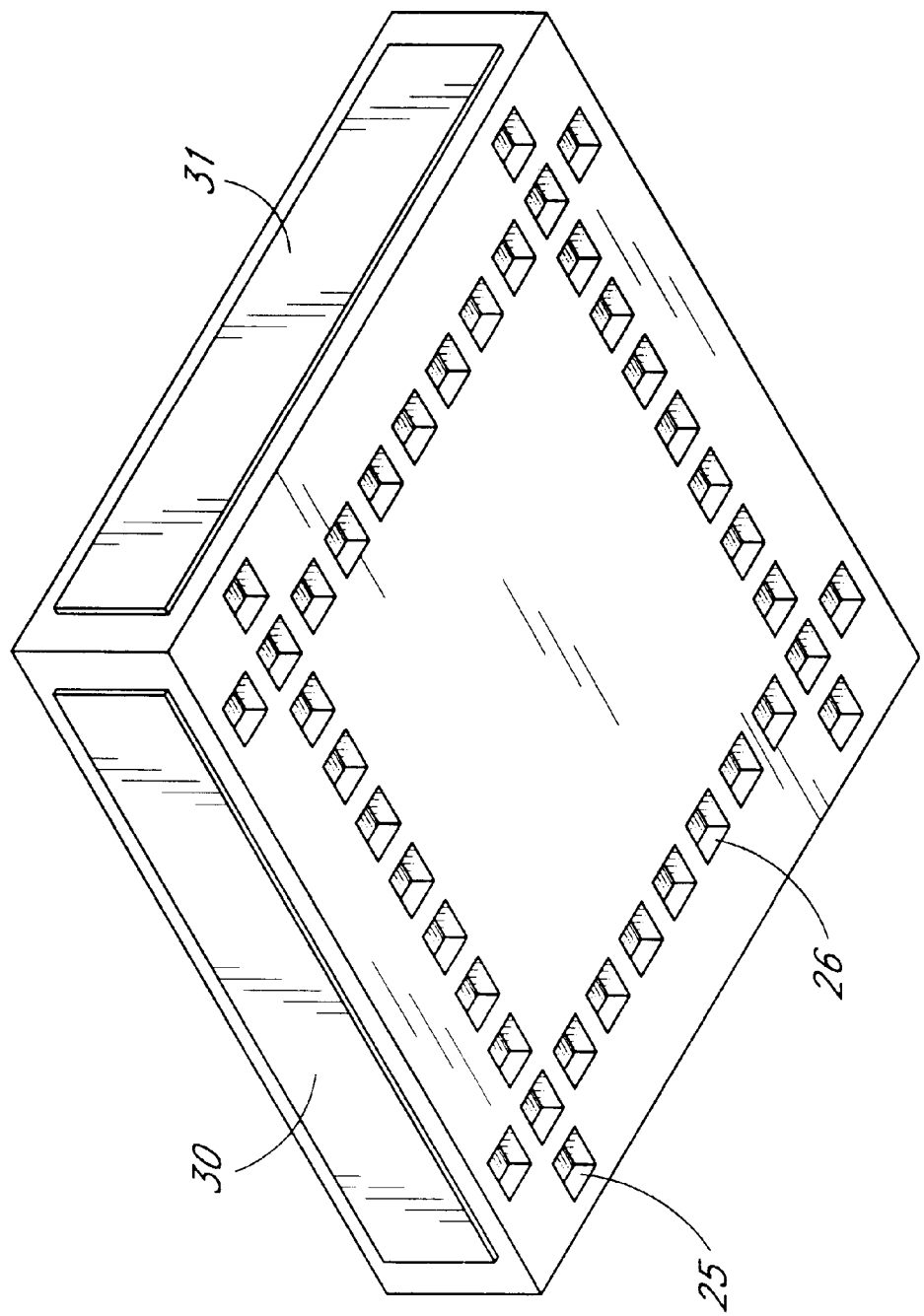
FIG. 17 is a predominantly bottom perspective view of an alternative exemplary battery for use with the invention.

As will be appreciated by those skilled in the art, a variety of different types of battery contacts 30, 31 can be used to reversibly place both the car and the charging station in electrical contact with the battery. In one embodiment, the contacts 30, 31 are retractable, spring-loaded members which retract into the housing of the battery in response to a physical driving force. In other embodiments, conductive contact surfaces either above or below the adjacent surface of the battery can be used in place of the retractable contacts. Alternatively, any of a variety of plugs, clips, conductive cables and the like can be used. FIG. 17 best illustrates an alternative embodiment of the battery with elongated electrical contacts 30, 31 on the sides of the battery. The battery in FIG. 17 further depicts the recesses or notches 126 on the underside of the battery for use with a sprocket drive mechanism.

With reference to FIG. 1, the transverse drive notches 25 in the batteries are used by the conveyor system to laterally shift batteries from one longitudinal segment to the other longitudinal segment along the segment denoted generally by reference number 11. As best seen in FIGS. 8 and 9, because the transverse drive sprockets 24 and the longitudinal drive sprockets 27 cannot be simultaneously engaged with batteries, the sprockets 24 and drive means 24d are mounted on a frame structure 24f which is selectively vertically shifted by a ram 24r. Likewise a ram 27r vertically shifts the sprocket frame structure 27f and sprocket drive 27d. Thus, the sprockets 24 and 27 are selectively engagable with the battery drive recesses 25 and 26.

Figure 5B:
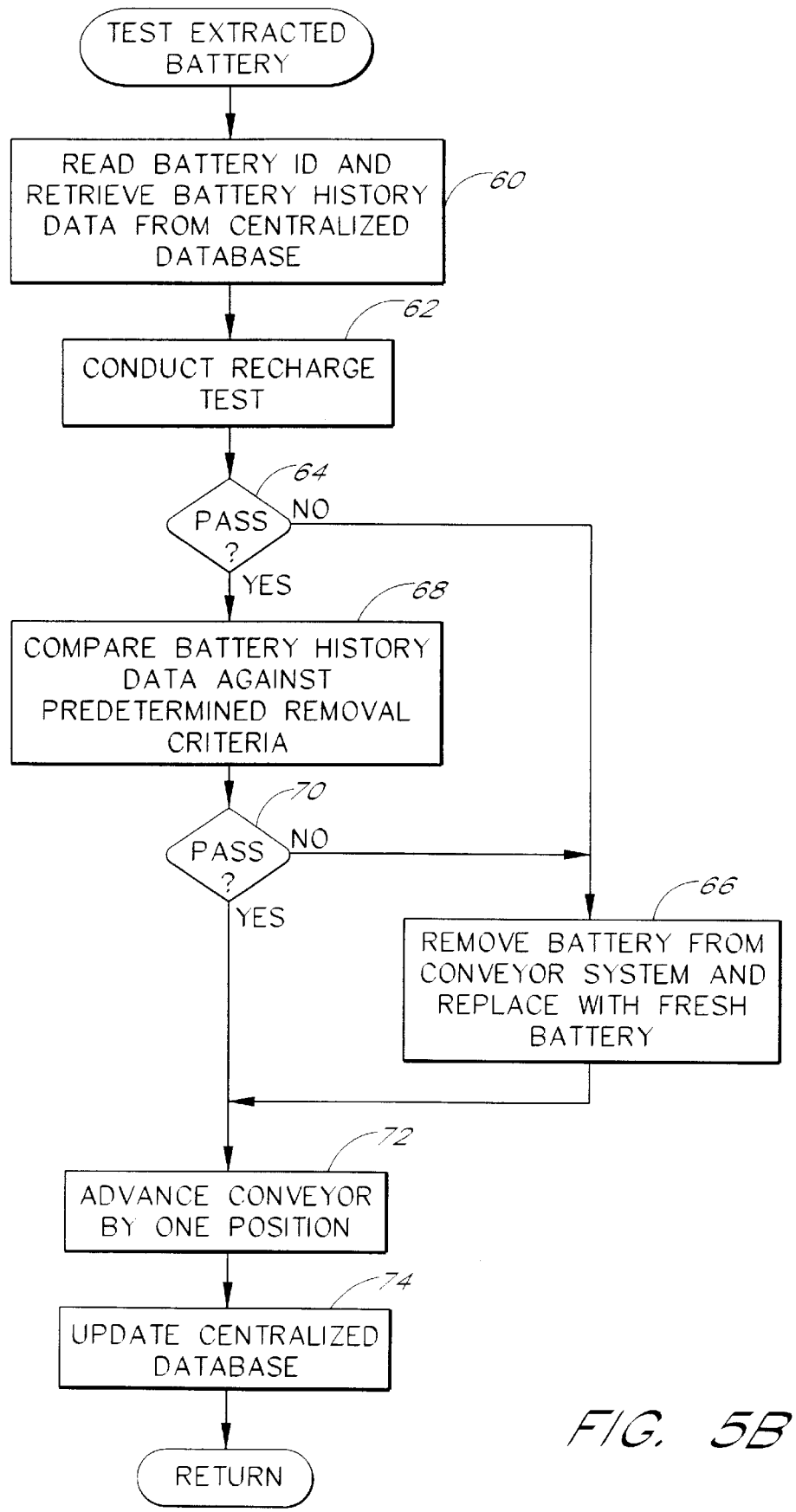
FIG. 5B illustrates a process followed by the computer of FIG. 5A when a battery is initially extracted from a vehicle.

FIG. 5B illustrates the general process followed by the computer 37 each time a battery is extracted from a vehicle. As depicted by block 60, the computer 37 initially reads the battery ID code with the bar code reader R, and then accesses the centralized database 40 to retrieve the history data of the battery. (In embodiments in which the history data is stored within the batteries, this step may, for example, involve an RF interrogation of the battery's circuitry to cause the battery to transmit its history data.) Concurrently with the data retrieval process, the computer 37 initiates the electrical battery recharge test to determine whether the battery can be adequately recharged, as indicated by block 62. If the battery fails the recharge test, it is removed from the conveyor C via the elevator assembly 43 and replaced with a fresh battery, as indicated by blocks 64 and 66.

With reference to blocks 68 and 70 if the battery passes the battery recharge test, the computer performs a second battery test which involves comparing the retrieved battery history data to pre-specified removal criteria, such as a maximum number of recharges and/or a maximum duration of use. If the battery fails to satisfy the predetermined criteria, it is removed from the system. This combination of an electrical test and a usage-history test provides a high degree of protection against the installation of bad batteries into vehicles.

With reference to blocks 72 and 74, once the battery tests have been conducted (and the battery replaced if necessary), the conveyor is advanced by one battery position. In addition, the centralized database is updated to reflect the results of the battery tests. If the system includes one or more expansion levels or modules (as in FIGS. 10 and 11), the computer 37 also executes code for shifting batteries between the two or more levels (as described below).

In addition to the battery testing code reflected by FIG. 5B, the computer 37 executes code for ensuring that the batteries are sufficiently recharged before being installed into vehicles. In the preferred embodiment, this is accomplished by keeping track, on a battery-specific basis, of the amount of time each battery has been recharged, and by ensuring that the next battery to be installed has been recharged for some minimum amount of time. (Because the batteries enter and exit the conveyor system on a first-in-first-out basis, the battery which resides at the delivery end 14 of the conveyor will normally have been in the system the longest.) In other implementations, a battery testing station may additionally or alternatively be provided at or near the battery delivery end 14 to test the batteries prior to installation. Whenever the computer 37 determines that the next battery to be installed within a vehicle is not sufficiently recharged, the computer displays a message on a road-side display sign (not shown) indicating that batteries are currently not available. This message also preferably indicates the number of minutes until recharged batteries will be available.

FIGS. 10 and 11 illustrate the general manner by which additional conveyor loops or modules are added to the system to increase battery capacity. The illustrated system includes a main conveyor loop C1, and an expansion conveyor loop C2 which is positioned above the main conveyor loop. Both conveyor loops are substantially identical to the conveyor loop C described above. Additional expansion conveyors can be added as needed to accommodate demand. In the preferred embodiment, both conveyor loops include charging stations (not shown) positioned along their respective longitudinal segments. Battery elevators 43A and 43B are provided at opposite ends of the two conveyor loops C1, C2 to permit the vertical movement of batteries between the two conveyor levels. Both conveyor loops C1, C2 preferably include battery chargers along their respective longitudinal segments, preferably at each battery position.

In operation, the battery elevator 43A at the receiving end receives displaced batteries from vehicles that pass through the system, and selectively delivers the discharged batteries (under the control of the computer 37) to either the upper or the lower conveyor loop C1, C2. The elevator 43B at the battery delivery end is similarly programmably shifted between the two conveyor levels to selectively remove batteries from the conveyor loops for delivery into vehicles. In the preferred embodiment, the computer 37 is programmed to alternate between the two conveyor loops so that roughly half of the batteries are passed through the lower loop C1 and the other half passed through the upper loop C2. With this general approach, the addition of new conveyor loops inherently increases the amount of time each battery spends in the system, and thus increases the available recharge time per battery. Additional conveyor loops can be added to accommodate increased demand.

Figure 12:
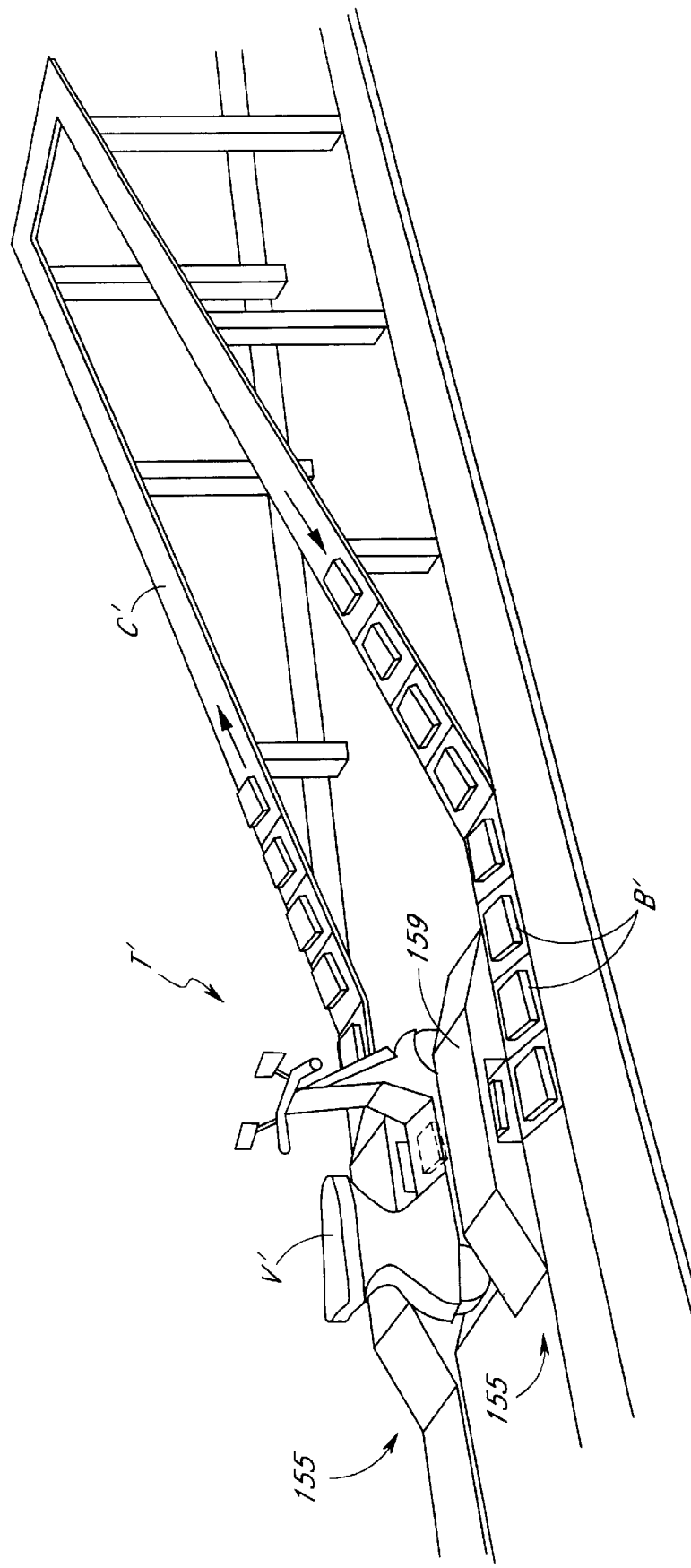
FIG. 12 is an isometric view illustrating a motorscooter battery transfer and charging system in accordance with the present invention.

A motorscooter embodiment of the battery transfer and charging system will now be described with reference to FIGS. 12–17. FIG. 12 illustrates the general layout and structure of a motorscooter battery charging and transfer system in accordance with one embodiment of the invention. The motorscooter system is a variation of the automobile battery charging and transfer system described above, and is specially adapted to handle a two-wheeled electric motorscooter. A preferred apparatus and method for exchanging batteries in a motorscooter will now be described, however the apparatus and method for exchanging batteries discussed above is directly applicable to the motorscooter battery transfer and charging system. As will be appreciated from the following description, the system can be adapted to handle electric motorcycles, mopeds, and other types of two-wheeled vehicles.

Figure 13:
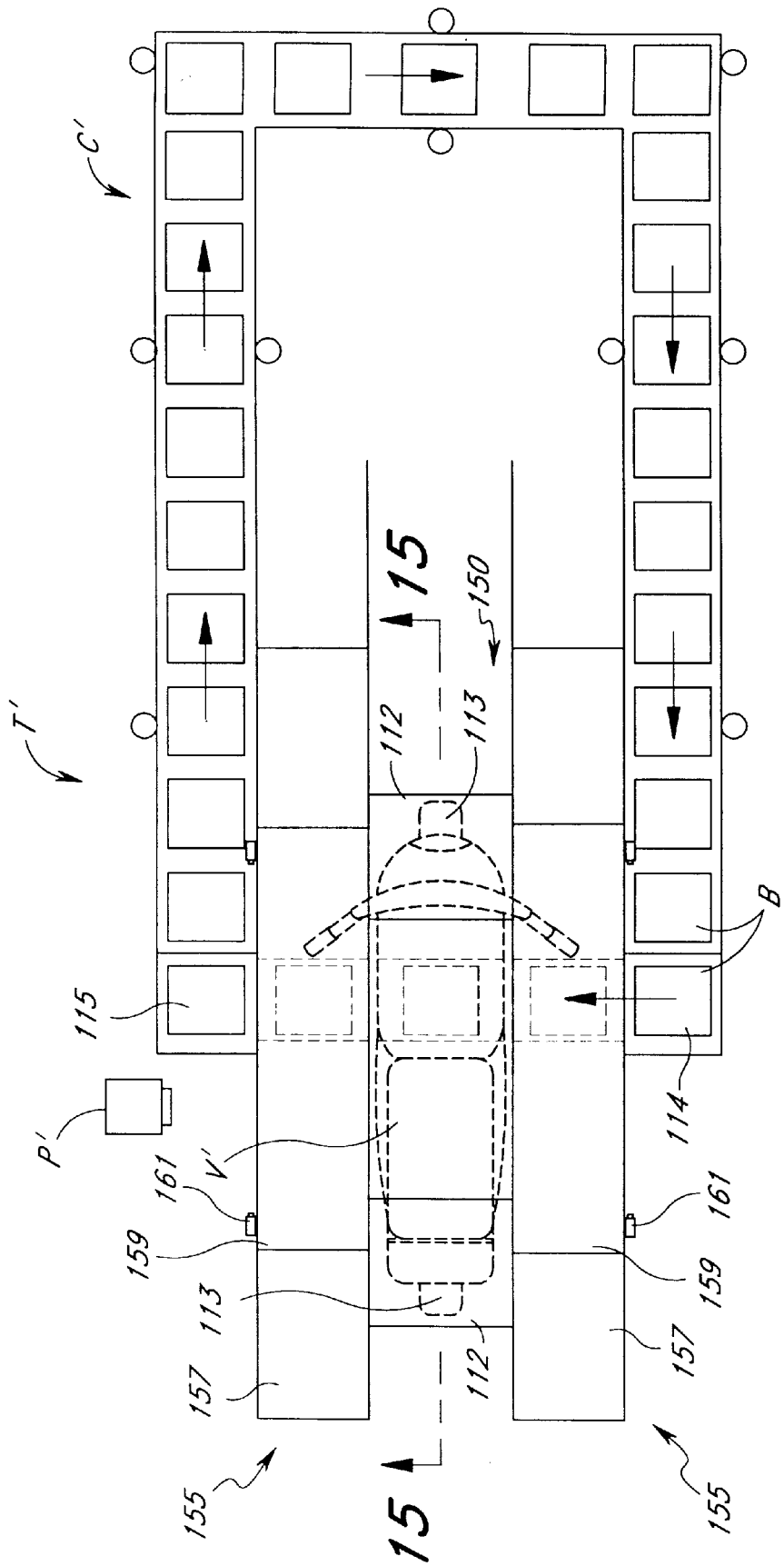
FIG. 13 is a top plan view of the battery transfer and charging system of FIG. 12, illustrating additional details of the system.

As illustrated by FIGS. 12 and 13, the system comprises a continuous battery conveyor loop C' which extends from one side of a vehicle station T' (shown with a motorscooter vehicle V' positioned therein) to the opposite side of the vehicle station T'. As in the automobile system of FIGS. 1–11, batteries B' move through the conveyor loop from the receiving end or station 115 of the conveyor to a delivery end 114 of the conveyor while being charged via multiple battery chargers (not shown). In this embodiment, however, the conveyor loop C' passes under an elevated support area 155 located on both sides of the vehicle. The elevated support area on each side of the vehicle is preferably identical in structure.

Figure 14:
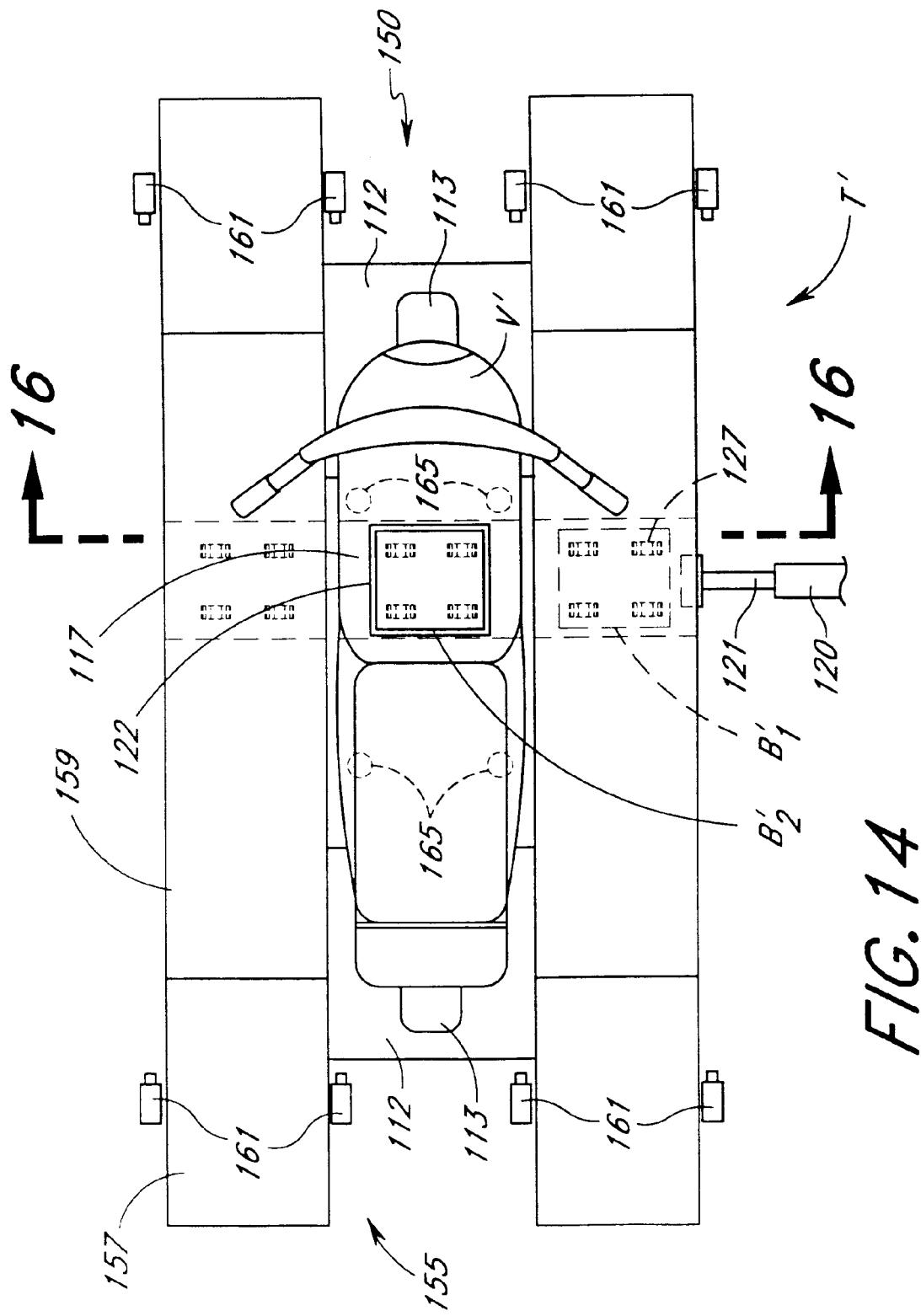
FIG. 14 is an enlarged top plan view illustrating one embodiment of a motorscooter support mechanism in accordance with the present invention.
Figure 15:
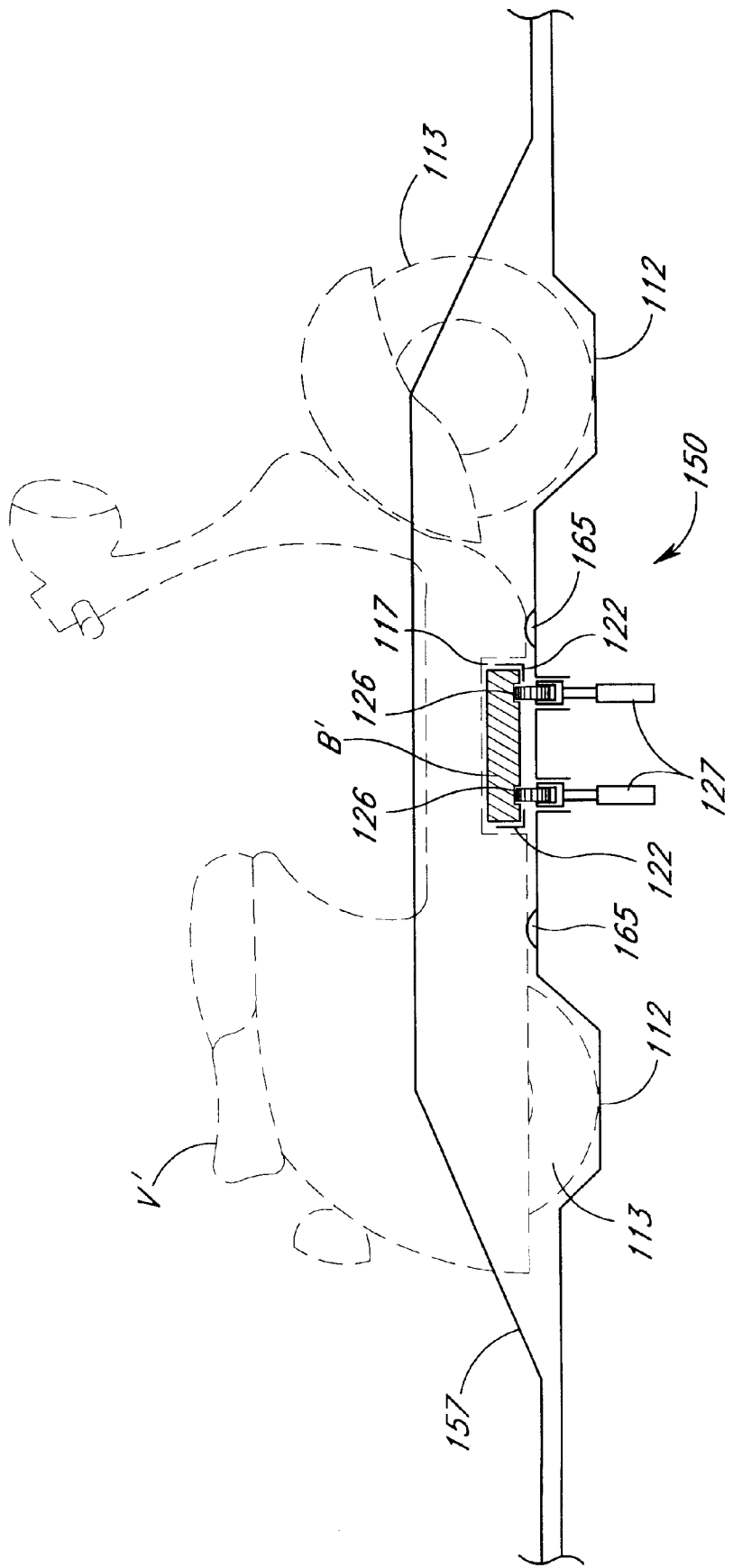
FIG. 15 is a vertical sectional view taken along the line 15—15 of FIG. 12.

As illustrated in FIGS. 14 and 15, the battery compartment 117 of the vehicle extends through the vehicle below the floor area where the operator's feet are positioned while riding the motorscooter. Ideally, electric motorscooters such as those manufactured by Kwang Yang Motor Company (KYMCO) and Piaggio SpA will be modified and equipped to provide a battery compartment as described. In addition, the battery transfer station may be readily adapted for other electric motorscooter-type vehicles, such as three-wheeled rickshaws manufactured by India's Baja Auto Limited and various four-wheeled all-terrain vehicles.

Unlike the battery exchange involving an automobile where the operator and passengers remain in the vehicle, the motorscooter system is preferably designed such that the operator of the motorscooter must dismount the vehicle during battery exchange. The elevated support area 155 consists primarily of a landing 159 which allows the operator of the vehicle to stand above the conveyor without interfering with the battery exchange operation. In addition, the support area 155 provides added safety for the operator of the vehicle by elevating the operator above the conveyor C' during battery transfer. The elevated support area 155 functions in conjunction with the battery conveyor C' to allow vehicles to enter and exit the system without reversing direction, thus allowing the vehicles to efficiently pass through the system in sequential fashion. In one particular embodiment, the vehicle operator utilizes the elevated support area to walk up the ramp 157 and place the motorscooter into position within the vehicle securing station 150. The operator remains situated on the landing 159 of the elevated support area 155 as the vehicle is positioned and secured within the vehicle securing station 150. Motorscooters of standard length are uniformly longitudinally positioned in the transfer station. When the battery exchange operation is complete the operator pulls the vehicle forward.

As further illustrated in FIG. 13, the electronic payment system P' described above can be accessed while the operator is standing on the landing 159 of the elevated support area 155.

As will be appreciated by those skilled in the art, alternative embodiments may be employed in lieu of an elevated support area in order for the vehicle operator to position the motorscooter within the transfer station. For example, a conveyor mechanism or similar apparatus can be utilized to move the vehicle into position within the vehicle securing station. Alternatively, the operator can move the vehicle into position on a level surface and cross over the battery conveyor via a step, rather than a ramp, in order to preserve the sequential processing of vehicles. Alternatively, the battery exchange operation can be initiated by a transfer station operator or attendant.

As illustrated in FIG. 13, the elevated support area 155 optionally includes an optical sensor device 161 for detecting the presence of the vehicle operator on the elevated support area. The elevated support area 155 is located on both sides of the vehicle V' and both sides can be equipped with an optical sensor device 161, thus monitoring the presence of additional vehicle passengers or a vehicle operator utilizing the opposite ramp to position the vehicle in the transfer station T'. The sensor 161 is preferably positioned just below the surface of the landing area 159 on the elevated support 155. The sensor 161 is also preferably coupled to the computer system described above via conventional control circuitry. This sensor 161 ensures that the operator is safely away from the battery exchange conveyor area before commencing a battery exchange by monitoring the area around the elevated support area 155. When the sensor 161 detects an object in the path of the optical beam, a control signal is generated to stop the conveyor. This sensor 161 provides an added safety feature for the motorscooter operator not required for an automobile battery exchange system. Alternatively, the sensor can monitor the presence of a transfer station attendant when the battery exchange operation is initiated or performed by an attendant.

As will be appreciated by those skilled in the art, a variety of different sensor devices may be employed to detect the presence of a person on the landing of the elevated support area. For example, detection of an operator's presence on the landing area may be achieved using an weight sensor located just below the landing surface. This sensor would be configured to measure a threshold weight before the battery exchange operation will commence.

In the embodiment depicted by FIG. 14, the transfer station T' includes a hydraulic ram 120 having a rod 121 which laterally forces the battery B1' into a battery seat 122 in the vehicle. The battery B1' displaces the existing vehicle battery B2', forcing the existing battery B2' onto an exit conveyor toward the receiving end 115 of the conveyor. One or more drive sprockets 127 may be provided at the receiving end as in FIG. 7 to complete the battery exchange operation. Alternatively, the battery exchange operation can be initiated and manually performed by a transfer station operator or attendant.

In a preferred embodiment as depicted by FIG. 15, drive sprockets 127 alone are used to engage with notches 126 on the underside of the vehicle's battery to accomplish the battery exchange. The drive sprockets are positioned below the underside of the battery in the floor of the vehicle securing station 150. The sprockets 127 are provided on a hydraulic vertical lift that can be raised or lowered to engage with the battery located in the battery compartment 117 of the vehicle. The sprockets then retract into the floor to allow the vehicle to exit the transfer station T' upon completion of the exchange operation.

Optionally, this preferred embodiment can be configured to upwardly lift the battery from the battery seat 122 prior to the battery exchange operation. The battery seat 122 provides openings that are aligned with the notches 126 in the battery. The drive sprockets 127 provide a continuous lateral exchange of the battery from the battery delivery end 114 to the battery receiving end 115, functioning in conjunction with the drive sprockets of the battery conveyor, as discussed above.

As illustrated in FIG. 15, the transfer station T' includes a vehicle securing station 150 comprised of a positioning structure 112, shown as receptacles for both the front and back wheels 113 of the vehicle V'. As will be appreciated by those skilled in the art, a variety of different positioning structures can be used. If desired, the plural positioning structures 112 may be provided at various spaced locations to accommodate vehicles of different lengths. The positioning structure may alternatively be placed on a roller mechanism or track for adjusting the receptacles to varying distances between the front and rear wheels.

Additionally, the inner sides of the elevated support area 155 serve as added protection against the tipping of the vehicle V' while properly positioned within the motorscooter securing station 150.

As further illustrated in FIG. 15, the vehicle securing station 150 is equipped with rollers 165 located on the floor of the vehicle securing station 150 between the wheel receptacles 112. Once the vehicle V' is positioned within the vehicle securing station 150, the base of the vehicle 167 below the battery compartment 117 rests against the rollers maintaining the balance and upright position of the motorscooter during battery transfer. Preferably, the rollers 165 extend across the entire width of the motorscooter's underside to provide maximum vehicle stability. Additional rollers can be provided to increase balance if necessary. The rollers 165 also assist the operator in removing the vehicle from the station upon completion of the battery transfer operation.

As will be appreciated by those skilled in the art, any of a variety of different types of support structures may be employed in place of or in addition to the rollers 165. For example, the motorscooter can be secured in place with laterally-engaging rollers which contact the vehicle from the sides. The laterally-engaging rollers may lock into place upon payment by the operator, and subsequently unlock and retract from the vehicle upon completion of the battery transfer. Another embodiment may consist of a locking hub mechanism which engages from both sides near the tires of the motorscooter to properly hold the vehicle in place during battery transfer. Ideally, the contacting surfaces of the rollers, locking hub mechanism or other support mechanism will be constructed of a material that will not damage the finish of the motorscooter.

Figure 16:
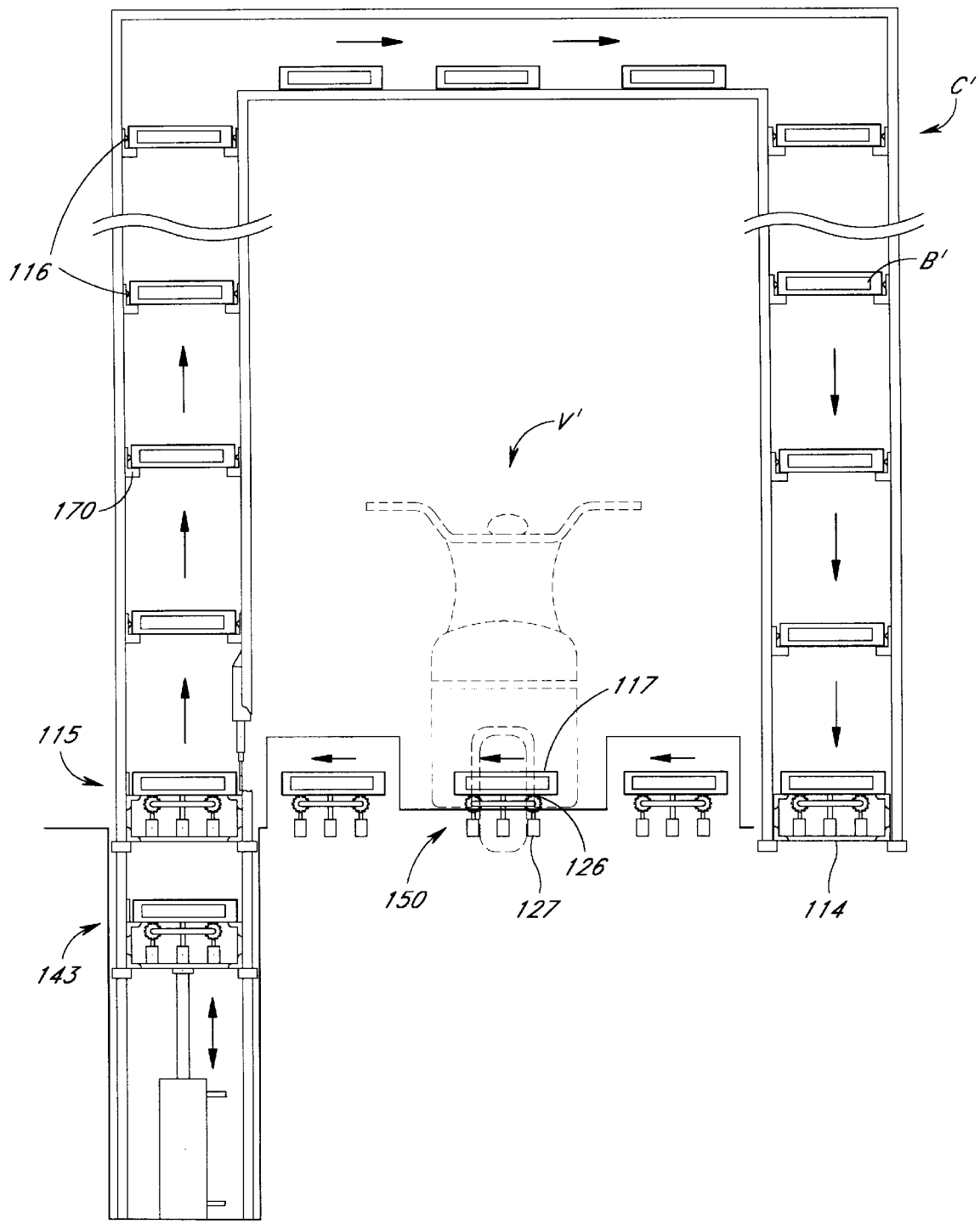
FIG. 16 is a transverse sectional view taken along the line 16—16 in FIG. 14, illustrating a vertically oriented embodiment of the battery transfer and charging system in accordance with the present invention.

FIG. 16 is representative of an alternative embodiment of the conveyor loop, and illustrates additional details of the vertically engaging sprocket mechanism described above. In this embodiment, the conveyor loop extends vertically above the vehicle, rather than in front of or behind the vehicle. The vertical conveyor loop is depicted with a motorscooter vehicle V' positioned and secured within the transfer station T'. Batteries B' are continuously charged while moving along the conveyor vertically over the vehicle, rather than longitudinally in front of the vehicle. As in the embodiments discussed above, the battery receiving end 115 is equipped with a vertical battery elevator 143 for removing batteries determined to be unfit for recharge. Preferably, the batteries are shifted from the battery delivery end 114 to the battery receiving end 115, through the battery compartment 117 of the vehicle via drive sprockets 127 deployed within the vehicle securing station 150 which engage with the notches or recesses 126 on the underside of the battery. As further illustrated in FIG. 16, the battery chargers 116 are located at various positions along the battery conveyor.

Lateral displacement of the batteries from the vehicle in the vertically oriented conveyor system is similar to the horizontal system described above. Preferably the batteries are carried vertically along the charging conveyor through the use of latches 170. For example, the latches 170 can engage with the notches or recesses in the underside of the battery to carry the battery vertically upwards and downwards along the conveyor belt. Alternatively, the latches 170 may contact the battery along the edge or corner without engaging with the notches or recesses. Lateral movement of the battery across the top of the conveyor can be accomplished using a sprocket mechanism like that disclosed above. As will be appreciated by those skilled in the art, any combination of latches, pulleys, belts, and sprockets can be utilized to carry the batteries along the conveyor loop.

The vertical embodiment just described also provides for increased battery capacity by optionally adding vertical conveyor loops or modules successively in front of an existing conveyor loop. Preferably, each additional conveyor loop would be no more than a few feet in front of the previous conveyor loop, thus increasing capacity without sacrificing space.

Although this invention has been described in terms of certain preferred embodiments, other embodiments that are apparent to those of ordinary skill in the art in view of the disclosure herein are also within the scope of this invention. Accordingly, the scope of the invention is intended to be limited only by reference to the appended claims.

What is claimed:

1. A method of rapidly exchanging a battery of an electrically powered two-wheel vehicle, said vehicle having a battery compartment which extends through at least a portion of the vehicle, the method comprising the steps of:

providing a battery charging and transfer station comprising:

a drive through bay including a vehicle securing station equipped with a positioning and support structure for maintaining the vehicle in an upright position; and a continuous battery transfer conveyor within the transfer station, the conveyor having a battery receiving end which receives a partially discharged battery from a first end of the battery compartment, and having a battery delivery end which delivers a charged battery to a second end of the battery compartment, the conveyor having multiple battery positions to store and recharge multiple batteries between the receiving and delivery ends;

positioning and supporting the vehicle in an upright position within the vehicle securing station such that the battery compartment is aligned with the battery receiving and delivery ends of the conveyor, the battery compartment containing the discharged battery; and exchanging the discharged battery with the charged battery by advancing the conveyor to shift the charged battery from the delivery end of the conveyor into the compartment and moving the discharged battery from the compartment to the receiving end of the conveyor.

2. The method of claim 1, wherein exchanging the discharged battery with the charged battery comprises advancing the conveyor by exactly one battery.

3. The method as in claim 1, wherein the step of exchanging the discharged battery with the charged battery comprises advancing at least one sprocket into an exposed area on the bottom surface of the discharged battery to shift the discharged battery from the battery compartment.

4. The method as in claim 1, wherein the step of exchanging the discharged battery with the charged battery comprises engaging at least one sprocket into an exposed area on the bottom surface of the discharged battery to lift the discharged battery from the battery compartment.

5. The method as in claim 1, further comprising advancing the vehicle through the transfer station above or below a vertically displaced segment of the conveyor without interrupting the battery transfer path between the receiving and delivery ends of the conveyor.

6. The method as in claim 1, further comprising a computer coupled to the battery transfer conveyor such that the computer programmably moves batteries by advancing the conveyor from the receiving end to the delivery end.

7. The method as in claim 1, further comprising a computer coupled to an electronic payment system, the payment system configured to allow an operator of a vehicle to specify payment source information for payment of a fee associated with a battery exchange operation.

8. A method of rapidly exchanging a battery of an electrically powered two-wheel vehicle, the vehicle having a battery compartment which extends within at least a portion of the vehicle, the method comprising the steps of:

providing a battery charging and transfer station comprising:

a drive through bay including a vehicle securing station equipped with a positioning and support structure for maintaining the vehicle in an upright position and orienting the vehicle for the battery exchange;

a continuous battery transfer conveyor within the transfer station, the conveyor having a battery receiving end which receives a discharged battery from the battery compartment, and having a battery delivery end which delivers a charged battery to the battery compartment, the conveyor having multiple battery positions to store multiple batteries between the receiving and delivery ends;

positioning and supporting the vehicle in an upright position within the vehicle securing station such that the battery compartment is aligned with the battery receiving and delivery ends of the conveyor, the battery compartment containing the discharged battery; and exchanging the discharged battery with the charged battery by moving the charged battery from the delivery end of the conveyor into the compartment and moving the discharged battery from the compartment to the receiving end of the conveyor.

9. The method as in claim 8, wherein exchanging the discharged battery with the charged battery comprises advancing the conveyor by exactly one battery.

10. The method as in claim 8, wherein said conveyor comprises at least one battery charger for recharging batteries between the battery receiving end and the battery delivery end.

11. The method as in claim 8, wherein the step of exchanging the discharged battery with the charged battery comprises advancing at least one sprocket into an exposed area on the bottom surface of the discharged battery to shift the discharged battery from the battery compartment.

12. The method as in claim 8, wherein the step of exchanging the discharged battery with the charged battery comprises engaging at least one sprocket into an exposed area on the bottom surface of the discharged battery to lift the discharged battery from the battery compartment.

13. The method as in claim 12, wherein one or more drive sprockets engage with the discharged battery before the discharged battery is moved in the lateral direction.

14. The method as in claim 13, wherein the one or more drive sprockets move vertically and engage the discharged battery.

15. The method as in claim 8, wherein the step of exchanging the discharged battery with the charged battery comprises moving the discharged battery in a lateral direction and moving the charged battery in a lateral direction.

16. The method as in claim 15, wherein the one or more drive sprockets are arranged vertically below the discharged battery.

17. The method as in claim 8, wherein the step of exchanging the discharged battery with the charged battery comprises moving the discharged battery in a vertical direction and moving the charged battery in a vertical direction.

18. The method as in claim 8, further comprising advancing the vehicle through the transfer station above or below a vertically displaced segment of the conveyor without interrupting the battery transfer path between the receiving and delivery ends of the conveyor.

19. The method as in claim 8, further comprising a computer coupled to the battery transfer conveyor such that the computer programmably moves batteries by advancing the conveyor from the receiving end to the delivery end.

20. The method as in claim 8, further comprising a computer coupled to an electronic payment system, the payment system configured to allow an operator of a vehicle to specify payment source information for payment of a fee associated with a battery exchange operation.

21. The method as in claim 8, wherein the rapid battery exchange occurs in a period of time that is less than five minutes.

* * * * *